July 5, 1938.  F. M. GUY  2,122,838
UNIVERSAL COUPLING
Filed Oct. 3, 1936   2 Sheets-Sheet 1
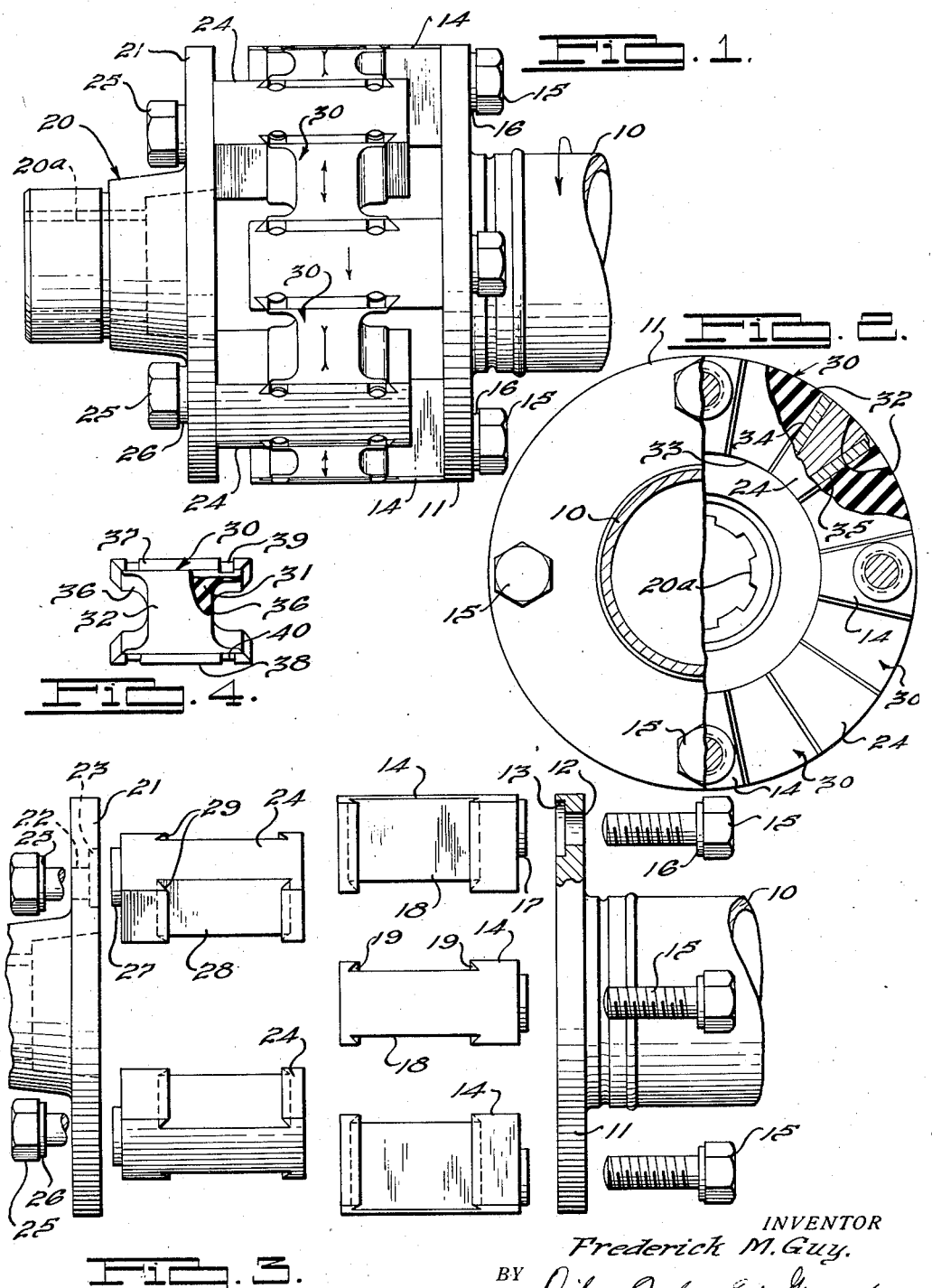
INVENTOR
Frederick M. Guy.
BY Dike, Calver and Gray
ATTORNEYS.

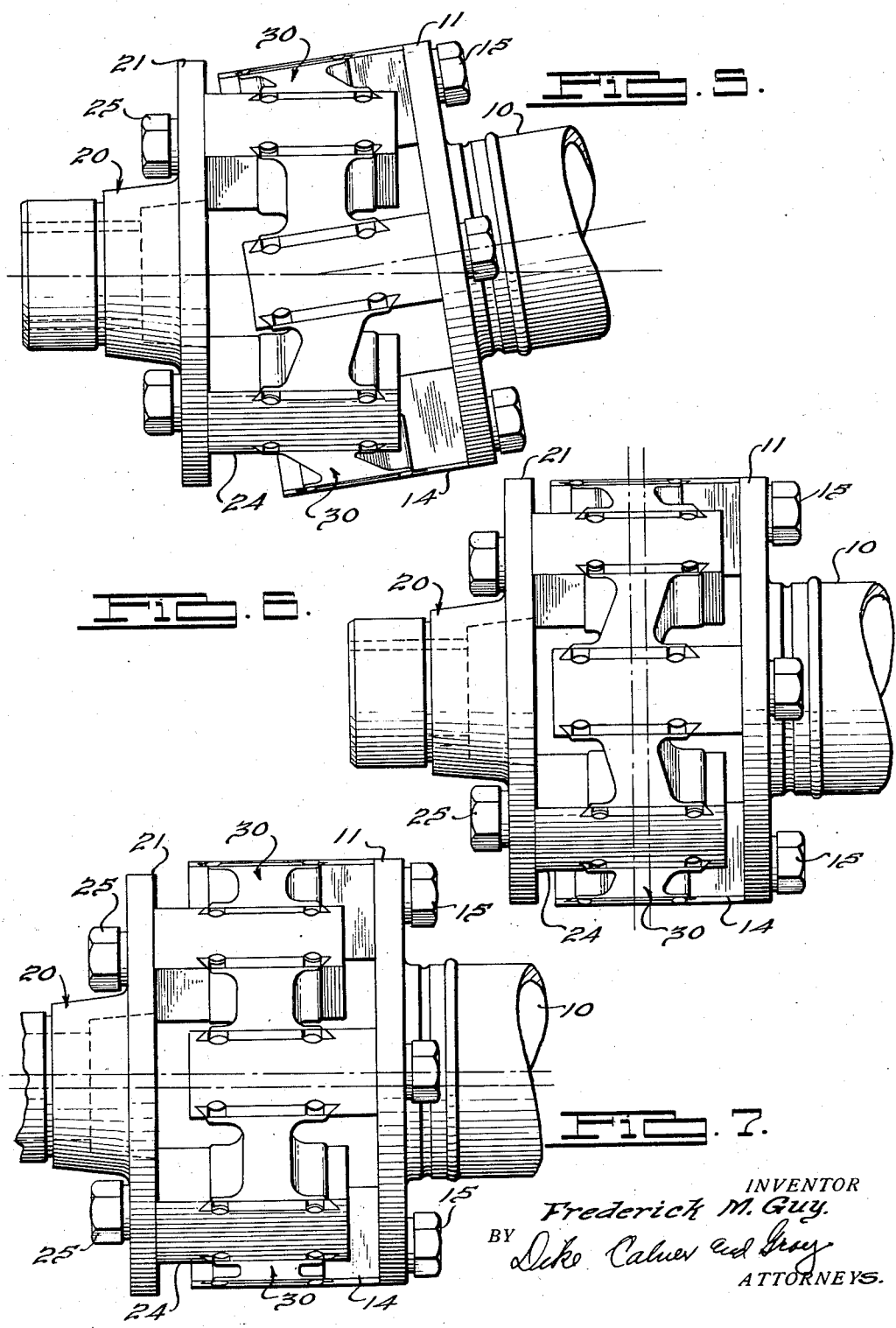

Patented July 5, 1938

2,122,838

UNITED STATES PATENT OFFICE 2,122,838

UNIVERSAL COUPLING

Frederick M. Guy, Detroit, Mich., assignor to Guy and Murton, Incorporated, Detroit, Mich., a corporation of Michigan Application October 3, 1936, Serial No. 103,843

3 Claims. (Cl. 64—14)

This invention relates to universal couplings adapted for use between connected shafts and more particularly to universal couplings in which various misalignments of the connected shafts are permitted by working of a resilient connection in the coupling interposed between the shafts.

Universal couplings or joints having resilient elements therein have been used successfully for connecting abutting shafts transmitting comparatively light torsional loads. The use of such couplings for transmitting high torsional loads requires the use of couplings of relatively larger sizes than is necessary in the use of non-resilient couplings for equivalent torsional loads. In motor vehicle structures, for example, while universal couplings with resilient driving connections have been successfully employed for driving auxiliary units, it has been found difficult in some instances to employ a resilient joint for connecting the transmission main shaft and the propeller shaft since the torsional loads are high and the space available for the joint is very limited.

An object of the present invention is to provide a universal coupling having resilient driving connection between the shafts, which coupling is of a compact design and relatively small in size and which has a high power and torque transmitting capacity per unit length of its radius, without substantial impairment of the resiliency of the resilient element embodied therein.

Another object of the invention is to provide a universal coupling of the above character which is simple in construction and cheap to manufacture, particularly in large volume, and more particularly which has a relatively small number of kinds of separate parts, many of which are identical and interchangeable.

A further object of the invention is to provide a resilient universal coupling which is easy to assemble, install, repair and service.

A further object of the invention is to provide a universal coupling embodying a resilient member which accommodates relative misalignment of the connected shafts by distortion of the resilient element, only, thus eliminating frictional wear on movable mechanical elements and the necessity for lubrication of the coupling.

A further object of the invention is to provide a universal coupling having a resilient member comprising a series of separate resilient blocks maintained in predetermined position between carrier elements connected with the connected shafts.

Other objects and advantages of this invention will appear in the following description and appended claims, reference being had to the accompanying drawings forming a part of this specification wherein a preferred embodiment of the present invention is illustrated.

In the drawings, wherein like reference characters designate corresponding parts in the several views, Fig. 1 is a front view of the universal coupling constructed in accordance with the present invention;

Fig. 2 is the end view of the coupling shown in Fig. 1 looking from the right, part of the structure being shown in section;

Fig. 3 is an exploded view of the coupling, resilient blocks being omitted for the sake of clarity;

Fig. 4 is a top view of one of the resilient blocks used in the structure;

Fig. 5 is a view showing the relative positions of the elements of the coupling and the shape assumed by the resilient blocks in the condition of angular misalignment of the shafts;

Fig. 6 is a view showing the coupling when the connected shafts are subjected to an end thrust;

Fig. 7 is a view showing the coupling in the condition caused by a transverse misalignment of the connected shafts, with their axes remaining parallel.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A coupling constructed in accordance with the present invention comprises, generally, two hubs having flanges extending transversely of the shafts. If desired one or both of said hubs may be integrally formed on the ends of the respective shafts. To each of said flanges are secured a plurality of studs or fingers, the same extending substantially parallel to the axis of the shaft and spaced substantially equidistant around the periphery thereof. The flanges are so arranged that the fingers of one shaft enter into the spaces between the fingers connected with the other shaft. Between said fingers are provided resilient blocks which are securely attached to the surfaces of the studs or fingers to eliminate relative movement between the surface of the fingers and the surfaces of the resilient blocks. The two rigid parts of the coupling are secured to the respective ends of the shafts and the connection therebetween is through the said resilient elements.

In the drawings there is shown by way of example a universal coupling embodying the present invention and adapted to transmit power from a driving shaft to a driven shaft. The invention will be hereinafter discussed with particular reference to its function in connecting the main transmission shaft and the propeller shaft of a motor vehicle since such use of the coupling demonstrates a wide variety of conditions which must be met by the coupling. In such an embodiment the propeller shaft is integrally connected with the coupling, while the transmission shaft is externally splined and engages an internally splined hub forming a part of the coupling. However, it is to be expressly understood that I do not desire to limit myself to this particular arrangement, since my novel coupling may be easily changed to have two hubs engaging the respective ends of the shafts in any suitable manner such as by splining, key and slot means, set screws, and the like. Also it may be advantageous in many instances to have flanges formed directly on the shaft ends, as in the propeller shaft of the present embodiment, thus having both of the connected shafts formed to provide an integral portion of the coupling.

In the present embodiment of the invention illustrated in the drawings, the numeral 10 indicates a tubular shaft, such as the propeller shaft of a motor vehicle, on the end of which is integrally formed an outwardly extending flange 11 having a plurality of holes 12 countersunk as at 13. A plurality of studs or fingers 14 are secured to said flange 11 as by means of a plurality of screws 15 provided with lock washers 16, bosses 17 provided at the respective ends of the fingers entering the countersunk portions of the holes 12, or by any other desired manner. The fingers 14 are made in the form of cylindrical sectors, their sides converging radially toward the axis of the shaft 10. Said converging sides are slotted as indicated at 18, the slots being radially arranged and having sides 19 permitting sliding of the mating member during assembly in a radial direction only. For the purpose of economy and simplicity I prefer to form the fingers 14 from ordinary cold rolled bar stock. Opposite the flange 11 there is provided a flanged hub 20 adapted to engage by its internally splined portion 20a an externally splined end of the second shaft (not shown). The flange 21 of said hub is similar to the flange 11 of the shaft 10. Similarly to said flange 11, the flange 21 is provided with an equal plurality of holes 22 countersunk as at 23. An equal plurality of fingers 24 is secured to the flange 21, said fingers 24 being similar in their construction to fingers 14 and secured to said flange 21 in substantially the same manner. Screws 25, washers 26, bosses 27, slots 28 and sides 19 correspond respectively to screws 15, washers 16, bosses 17 and slots 18 of the structure mounted on the flange 11.

The flanges 11 and 21 are so arranged that the longitudinal axes of the connected shafts are coincident, and the fingers 14 affixed to the flange 11 enter the spaces between the fingers 24 of the flange 21, but do not reach said flange 21. Since fingers 14 and 24 are of equal length, there is an equal clearance between the fingers 24 and the flange 11.

Resilient connection between the fingers 14 and 24, and consequently between the shaft 10 and the hub 20, is effected by means of a plurality of resilient blocks 30 preferably formed of rubber or similar resilient materials. Referring to Fig. 4, wherein one of said blocks is illustrated, the same comprises a resilient portion 31, its shape being defined by the outer and inner cylindrical surfaces 32 and 33, and by longitudinal substantially radial planes such as 34 and 35 extending outwardly from the axis of the coupling. The transverse sides or faces of said portion 31 are shaped as indicated at 36 in order to eliminate the excess of resilient material in the section and to provide wide side surfaces for bonding the rubber to metal plates 37 and 38, which plates are adapted to engage slots 18 and 28, thus connecting the fingers 14 and 24.

Blocks 30 are prevented from sliding further toward the axis of the coupling by the converging arrangement of the slots. Means are provided for preventing throwing out of the blocks 30 outwardly by the centrifugal force of rotation. In the present embodiment said means are exemplified by the shallow transverse recesses 39 and 40 provided on the outward surfaces of the metal plates 37 and 38, respectively. When the blocks 30 are inserted in the slots, the metal at the edges of the fingers is peened over with a center punch to occupy part of the recesses 39 and 40, as shown in Fig. 1, thus positively locking the blocks in place. When it is desired to remove the block, some of the peened over metal is removed and the entire block may be removed by pressing its plates outwardly toward the periphery of the coupling.

It will now be clear in view of the foregoing that with the aid of my novel universal coupling it is possible to connect two abutting shafts transmitting high torsional loads and to provide for their smooth operation under conditions of changing angular speed and various types of axial misalignments. From an examination of Fig. 1 it will be seen that when the coupling is in operation, the torque load is taken by the blocks 30, and the same are compressed and stretched, the compressed and stretched blocks alternating as indicated in Fig. 1 by double-headed arrows. The bonded surfaces of rubber and metal are subjected to a negligible amount of shear or forces tending to produce relative sliding of said surfaces.

Since the blocks 30 are somewhat compressed when inserted into the slots 18 and 28, their operative distortion begins from compression rather than from tension, this being important because the compressive strength of rubber is greater than its tensile strength.

Fig. 5 illustrates the relative positions of the structural elements of the coupling and the shape assumed by the blocks 30 when the longitudinal axes of the connected shafts are angularly misaligned. It will be seen that in such a condition the resilient blocks 30 easily adapt themselves to the axial misalignment of the shafts, and the same may operate smoothly and without objectionable heating of the rubber. Fig. 6 shows the relative positions of the structural elements of the coupling when the shafts are subjected to an end thrust, their axes remaining otherwise constant. Fig. 7 illustrates the axial offset condition of the coupling, with the axes of the connected shafts remaining parallel. Although in actual operative conditions any combination of the above described misalignments may occur, the same is provided for by distortion of the resilient blocks.

Thus considered from one of its broader aspects my invention contemplates providing a novel universal coupling in which torsional loads transmitted thereby subject the resilient members to both compression forces and to tension strains without subjecting the surfaces thereof to appreciable shearing stresses. Since rubber is essentially non-compressible, the compression forces cause the rubber to flow and thus provides an increased amount of rubber at the points where the blocks are subjected to the tension strings.

I claim:

1. A universal coupling for connecting drivingly two abutting shafts, said coupling comprising two straight transversely extending flanges secured to the ends of said shafts, respectively, a plurality of detachable fingers secured to the faces of each of said flanges substantially perpendicular thereto and substantially flush with a periphery of said flanges, the fingers secured to different flanges being arranged alternatively, and a plurality of rubber blocks secured to said fingers substantially flush with the peripheral cylindrical surfaces of said flanges.

2. A universal coupling for connecting drivingly two abutting shafts, said coupling comprising two straight transversely extending flanges secured to the ends of said shafts, respectively, a plurality of detachable fingers secured to the faces of each of said flanges substantially perpendicular thereto and substantially flush with a periphery of said flanges, the fingers secured to different flanges being arranged alternatively, and a plurality of rubber blocks secured between said fingers substantially flush with the peripheral cylindrical surfaces of said flanges, each of said blocks having two metal plates to which said block is bonded, said plates being positively secured to said fingers and arranged flush with the periphery of the flanges.

3. A structure as defined by the preceding claim 2, the fingers being provided with radial slots into which the plates fit and secured to said fingers by peening.

FREDERICK M. GUY.